(No Model.)

T. LAS COUSINO.
TRACE CARRIER.

No. 260,943. Patented July 11, 1882.

Witnesses;
T. Walter Fowler.
H. B. Applewhaite.

Inventor;
Tunis Las Cousino
per attys.
A. H. Evans & Co.

UNITED STATES PATENT OFFICE.

TANIS LAS COUSINO, OF MONTEVIDEO, ASSIGNOR TO C. M. PALMER, OF MINNEAPOLIS, MINNESOTA.

TRACE-CARRIER.

SPECIFICATION forming part of Letters Patent No. 260,943, dated July 11, 1882.

Application filed May 22, 1882. (No model.)

*To all whom it may concern:*

Be it known that I, TANIS LAS COUSINO, of Montevideo, in the county of Chippewa and State of Minnesota, have invented an Improved Trace-Carrier; and I hereby declare the following to be a full, clear, and exact description thereof, reference being had to the accompanying drawings, in which—

Figure 1:
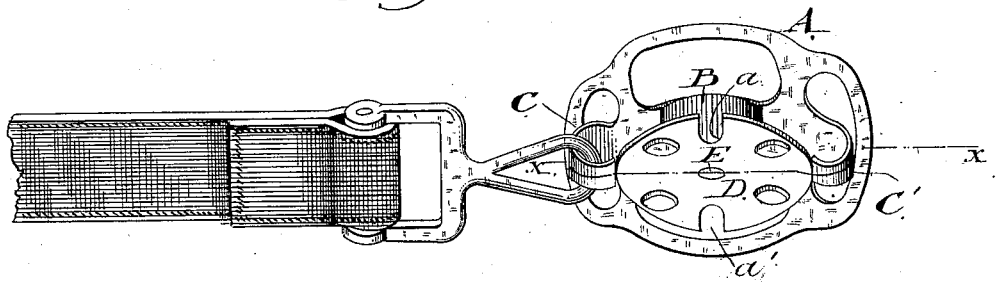
Figure 2:
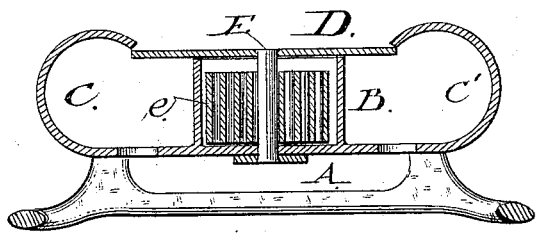

Figure 1 is a plan view of my invention applied. Fig. 2 is a longitudinal vertical section.

The object of my invention is to provide a trace-carrier which can be quickly and easily operated; and my invention consists in a frame having two hooks and a central hollow hub, upon which rotates a disk held by means of a coiled spring to a normal position, where the hooks will not register with certain openings cut in the edge of the disk, all of which will be hereinafter fully described and specifically claimed.

In order that those skilled in the art may make and use my invention, I will proceed to describe the exact manner in which I have carried it out.

In the said drawings, A is a skeleton plate, provided with proper openings to secure the tug, and a central hollow hub, B. On opposite sides of the hub rise hooks C C', the points of which overlap slightly the circular edge of a rotating disk, D, which rests upon hub B and turns upon a spindle, E, upon which a short coiled spring, $e$, is wound, which keeps the disk normally in such a position that openings $a$ $a'$ in the edge of the disk will not register with the hooks C C', and the disk acts as a keeper to the hooks (see Fig. 1) and prevents the cockeye of the trace from escaping. When the trace is to be hooked on or taken off, the disk is turned, as indicated in dotted lines, until the openings $a$ $a'$ register with the hooks C C', when the cockeye or ring of the trace or other harness can be passed over one of said hooks.

It is evident that very many designs can be made involving my invention without departing from its principle and spirit, and that it may be used in a variety of ways as a fastening device.

Having thus described my invention, what I claim as new, and desire to secure by Letters Patent, is—

The trace-carrier composed of the plate A, having hooks C C' and a central hollow hub, B, in combination with the rotating disk D, provided with openings $a$ $a'$ in its edge, and coiled spring $e$, substantially as and for the purpose set forth.

TANIS LAS COUSINO.

Witnesses:
J. B. BACON,
H. W. LAWRENCE.